(12) United States Patent
Owens

(10) Patent No.: US 12,490,714 B2
(45) Date of Patent: Dec. 9, 2025

(54) PET FOOD BOWL WITH INSECT EXCLUSION

(71) Applicant: Charles Owens, Zephyrhills, FL (US)

(72) Inventor: Charles Owens, Zephyrhills, FL (US)

(*) Notice: Subject to any disclaimer, the term of this patent is extended or adjusted under 35 U.S.C. 154(b) by 0 days.

(21) Appl. No.: 18/626,580

(22) Filed: Apr. 4, 2024

(65) Prior Publication Data

US 2025/0311696 A1 Oct. 9, 2025

(51) Int. Cl.
*A01K 5/01* (2006.01)

(52) U.S. Cl.
CPC .................. *A01K 5/0142* (2013.01)

(58) Field of Classification Search
CPC ........................ A01K 5/0142; A01K 39/0113
See application file for complete search history.

(56) References Cited

U.S. PATENT DOCUMENTS

| | | | | |
|---|---|---|---|---|
| 3,441,003 | A * | 4/1969 | Lister .................. | A01K 5/0114 43/121 |
| D273,430 | S * | 4/1984 | Salinas ................ | D30/130 |
| 4,953,506 | A * | 9/1990 | Sanders ............... | A01K 5/0142 119/61.53 |
| 5,069,167 | A * | 12/1991 | Kasselman ......... | A01K 5/0142 D30/132 |
| 5,253,609 | A * | 10/1993 | Partelow ............ | A01K 39/0113 119/61.53 |
| 5,277,149 | A * | 1/1994 | East .................... | A01K 7/00 119/51.5 |
| 5,794,564 | A * | 8/1998 | Paro ................... | A01M 29/34 119/61.53 |
| 6,125,790 | A * | 10/2000 | Breedwell ........... | A01K 5/0142 119/51.5 |
| 6,167,840 | B1 * | 1/2001 | White ................. | A01K 5/0142 119/72 |
| 6,860,229 | B1 * | 3/2005 | Craft .................. | A01K 5/0142 119/61.5 |
| 7,284,499 | B1 * | 10/2007 | Kuster ................ | A01K 7/025 119/61.5 |
| 8,807,082 | B1 * | 8/2014 | Alfonso .............. | A01K 5/0142 119/51.5 |
| 11,026,398 | B1 * | 6/2021 | Hoffman ............ | A01K 5/0114 |
| 2008/0072830 | A1 * | 3/2008 | Wrigge .............. | A01M 29/34 119/61.53 |
| 2008/0163820 | A1 * | 7/2008 | Bennett .............. | A01M 29/34 119/61.54 |
| 2010/0170447 | A1 * | 7/2010 | Pridgen, Jr. ........ | A01K 5/0128 119/61.53 |
| 2023/0000068 | A1 * | 1/2023 | Warthen ............. | A47G 7/041 |

* cited by examiner

*Primary Examiner* — Timothy D Collins

(74) *Attorney, Agent, or Firm* — Distinct Patent Law; Justin P. Miller

(57) ABSTRACT

The pet food bowl with integrated insect exclusion prevents crawling insects from reaching exposed pet food. The device includes two bowls. The first bowl, or lower bowl, acts as a water basin or moat. Any insect that tries to reach the upper bowl must cross the water held within the lower bowl. The water prevents the majority of insects from being able to pass, including, for example, ants. A weighted enclosure is removably positioned within the lower bowl or water basin. The weighted enclosure is optionally filled with a dense material, such as sand, rocks, or metal. This weight within the weighted enclosure helps to maintain the device in the correct position, even when a large animal, such as a dog, is pushing and pulling on the upper food bowl during eating.

17 Claims, 9 Drawing Sheets

PET FOOD BOWL WITH INSECT EXCLUSION

FIELD

This invention relates to the field of pet food bowls and more particularly to a system for holding and supporting pet food while excluding crawling insects.

BACKGROUND

Providing fresh food and water for household pets is an important responsibility for pet owners. Pet owners typically place dry food, wet food, and water in bowls or dishes on the floor for the pet to access as needed. But this common practice of leaving pet food out in bowls attracts crawling insects such as ants and roaches. Pet owners often find trails of ants or other insects leading to and entering pet food bowls. Such insects are a nuisance and can contaminate the pet food supply.

Various methods have been employed to attempt to prevent this problem, but each has significant drawbacks. Placing bowls on raised platforms or pedestals can help, but many insects can crawl vertical or inverted surfaces, allowing them to reach the raised platforms. Placing bowls in the center of the room away from walls can make it harder for insects to travel to the bowls but requires leaving a clear radius around the bowls. Using insecticide sprays or powders around bowls creates risks of exposing pets to toxic chemicals. Regularly removing and storing pet bowls between meals is tedious and inconvenient.

There is consequently a need for improved ways to prevent insects from accessing pet food bowls while allowing pets normal access for feeding.

SUMMARY

The pet food bowl with integrated insect exclusion prevents crawling insects from reaching exposed pet food. The device includes two bowls. The first bowl, or lower bowl, acts as a water basin or moat. Any insect that tries to reach the upper bowl must cross the water held within the lower bowl. The water prevents the majority of insects from being able to pass, including, for example, ants.

The lower water basin has an upwardly extending sidewall forming a reservoir that can be partially filled with water or other insect-deterring liquid.

A weighted enclosure is removably positioned within the lower bowl or water basin. The weighted enclosure is optionally filled with a dense material, such as sand, rocks, or metal. This weight within the weighted enclosure helps to maintain the device in the correct position, even when a large animal, such as a dog, is pushing and pulling on the upper food bowl during eating.

During use, the weighted box creates a space, or air gap, between the surface of the water in the lower pole and the base of the upper bowl, ensuring that insects have to cross the water to reach this weighted enclosure before they can climb up to the upper food bowl.

Stated differently, to access the pet food in the suspended upper bowl, crawling insects must first scale the upwardly extending sidewall of the lower basin, cross the liquid reservoir, and then climb the weight box. Any insects attempting this path become trapped in the liquid reservoir, unable to reach the pet food in the upper bowl. Meanwhile, the weight box prevents the suspended upper bowl from overturning or being easily dislodged by the household pet.

The weighted enclosure preferably includes a base and a removable lid, allowing the user access to the inside for adding or removing weight.

The weighted enclosure is affixed to the upper bowl and the lower bowl by a removable, or reclosable, fastener. In the preferred embodiment the fastener is 3M Duolock reclosable fasteners. This type of fastener can be opened and closed many times, and works well both wet and dry. The 3M Duolock reclosable fastener uses small mushroom-shaped heads that interlock.

The upper pet food bowl has a generally conventional configuration to hold dry or wet pet food. The upper pet food bowl rests on top of the weighted enclosure.

The bowls further optionally include an exterior wall hump or bump on the outer surface that protrudes outward to increase the angle a climbing insect must overcome to reach food within the upper bowl, and/or the bowls include an exterior lip, the lip also increasing the difficulty of climbing into the bowls.

The components can be manufactured from plastic and other lightweight, durable materials. In use, the insect exclusion pet food bowl provides an effective physical barrier to crawling insects, while providing the added benefit of raising the pet food bowl to a level more comfortable for the animal to eat.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
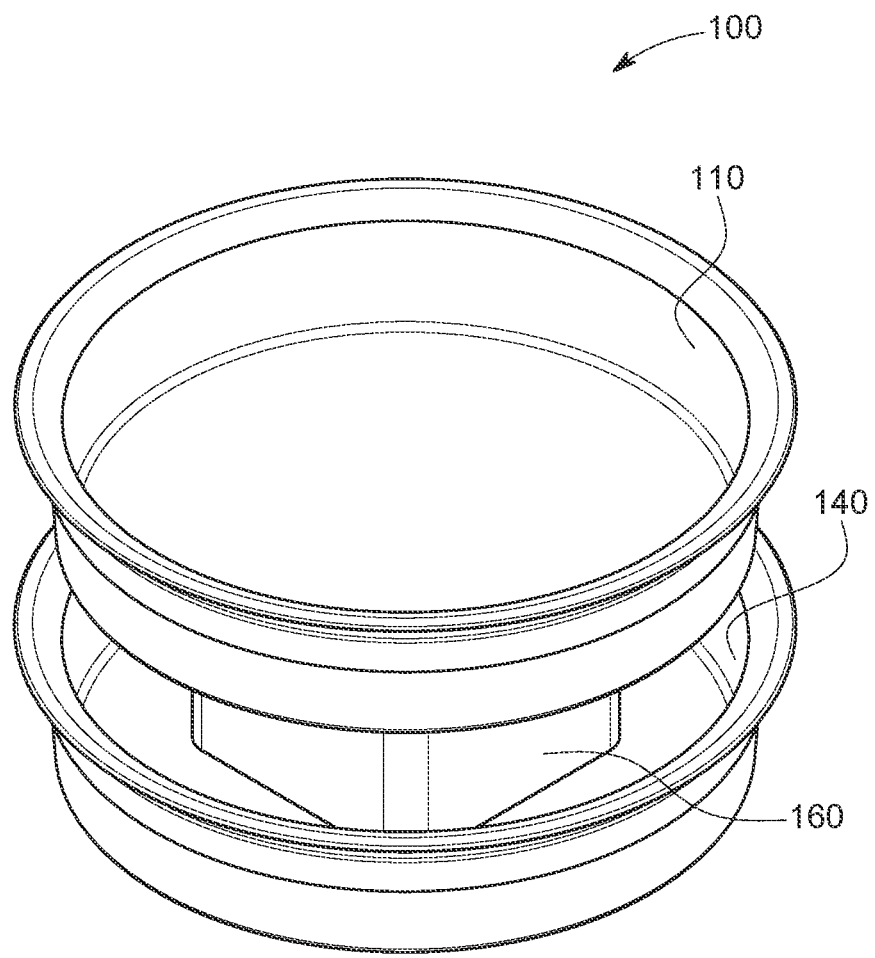
FIG. 1 illustrates a first isometric view of the pet food bowl with insect exclusion.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a first isometric view of the pet food bowl with insect exclusion is shown.

The pet food bowl with insect exclusion 100 is shown with upper bowl 110 and lower bowl 140 separated by weight box 160.

The upper bowl 110 and the lower bowl 140 are shown empty—prior to filling with pet food and water.

Figure 2:
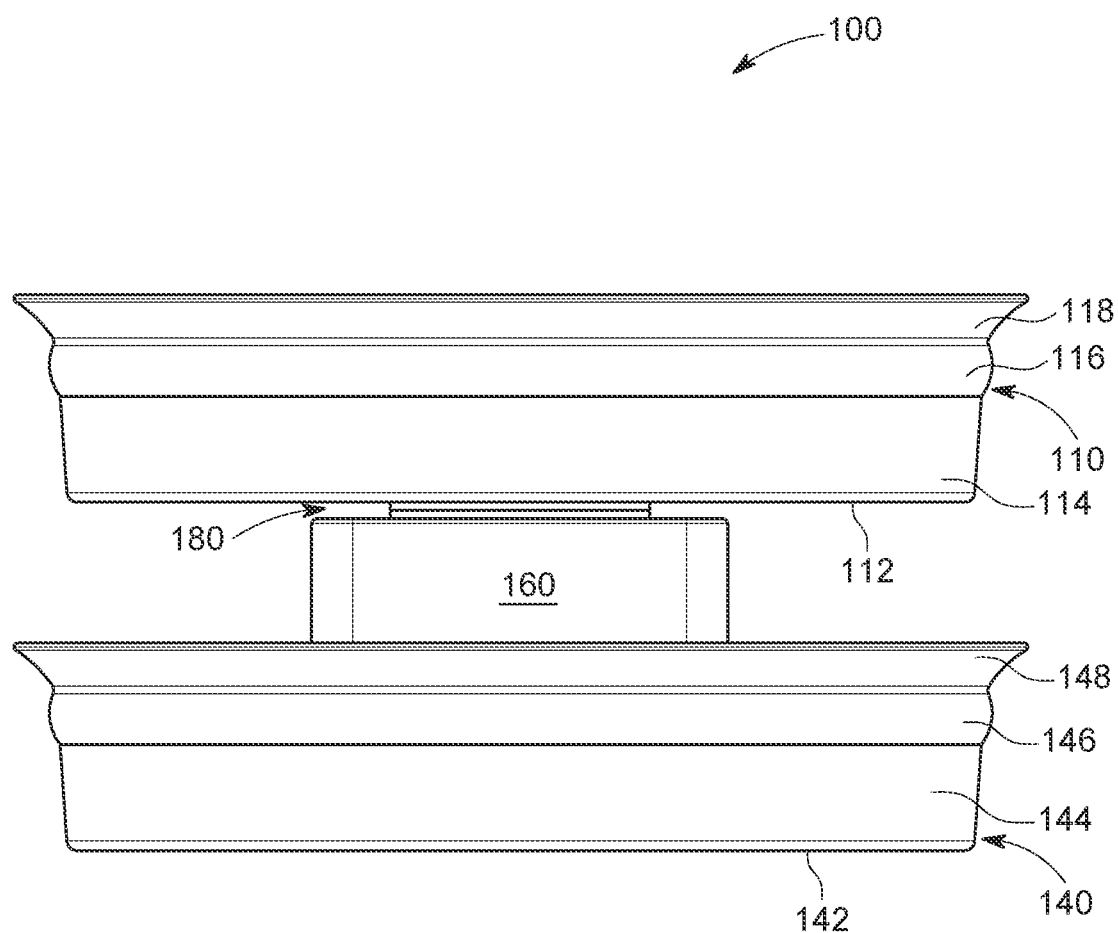
FIG. 2 illustrates a side view of the pet food bowl with insect exclusion.

Referring to FIG. 2, a side view of the pet food bowl with insect exclusion is shown.

The upper bowl 110 is the combination of multiple features, including an upper bowl base 112 connected to an upper bowl wall 114. The upper bowl wall 114 includes an external upper bowl wall hump 116 and upper bowl lip 118 that, acting together, helping to prevent crawling insects from reaching the top of the upper bowl 110.

The lower bowl 140 correspondingly includes a lower bowl base 142 connected to a lower bowl wall 144. The lower bowl wall 144 also includes a lower bowl wall hump 146 and lower bowl lip 148, again to discourage crawling insects.

To make it more difficult to overturn the pet food bowl with insect exclusion 100, a weight box 160 is placed in the lower bowl 140, lowering the center of gravity of the entire assembly. The weight box 160 also acts as a physical separation between the upper bowl 110 and lower bowl 140, forcing insects to cross the water (see FIG. 3) before being able to reach the upper bowl 110.

Figure 3:
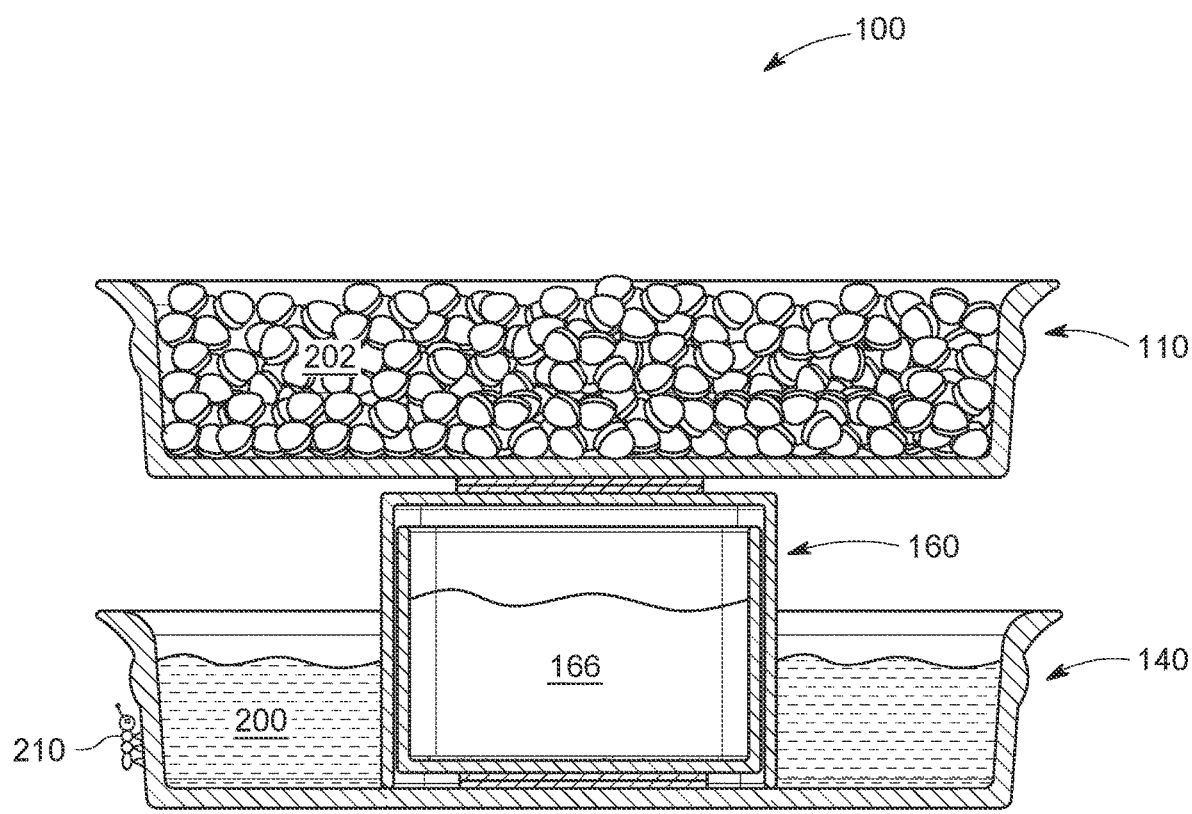
FIG. 3 illustrates a cross-sectional view of the pet food bowl with insect exclusion.

Referring to FIG. 3, a cross-sectional view of the pet food bowl with insect exclusion is shown.

The pet food bowl with insect exclusion 100 is shown with water 200 in the lower bowl 140 and pet food 202 in the upper bowl 110.

Sand 166 is shown within the weight box 160. Other weights may be substituted for sand 166.

An insect 210 is attempting to reach the pet food 202, but first must crawl up multiple vertical surfaces, across the water 200, and across the bottom of the upper bowl 110.

Figure 4:
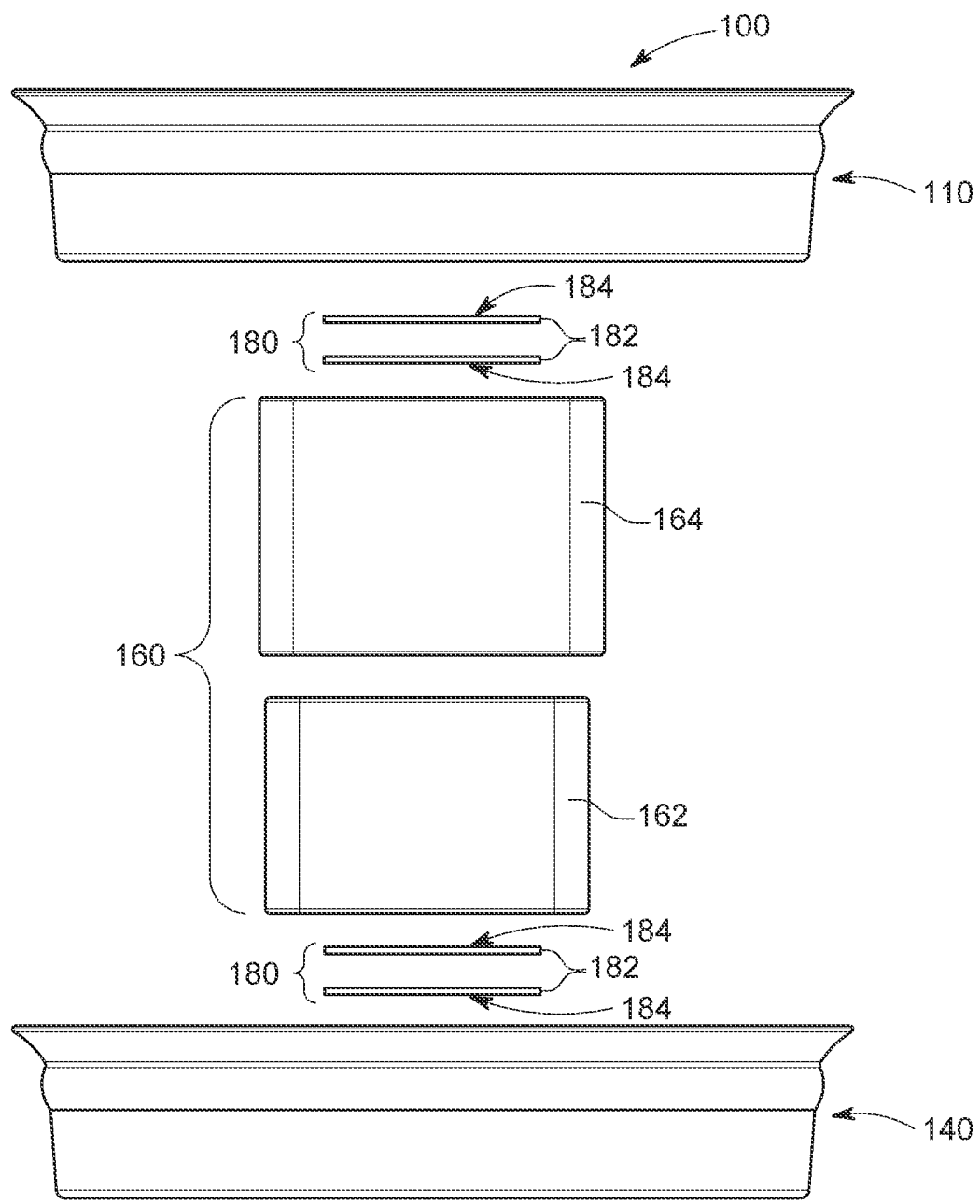
FIG. 4 illustrates an exploded side view of the pet food bowl with insect exclusion.
Figure 5:
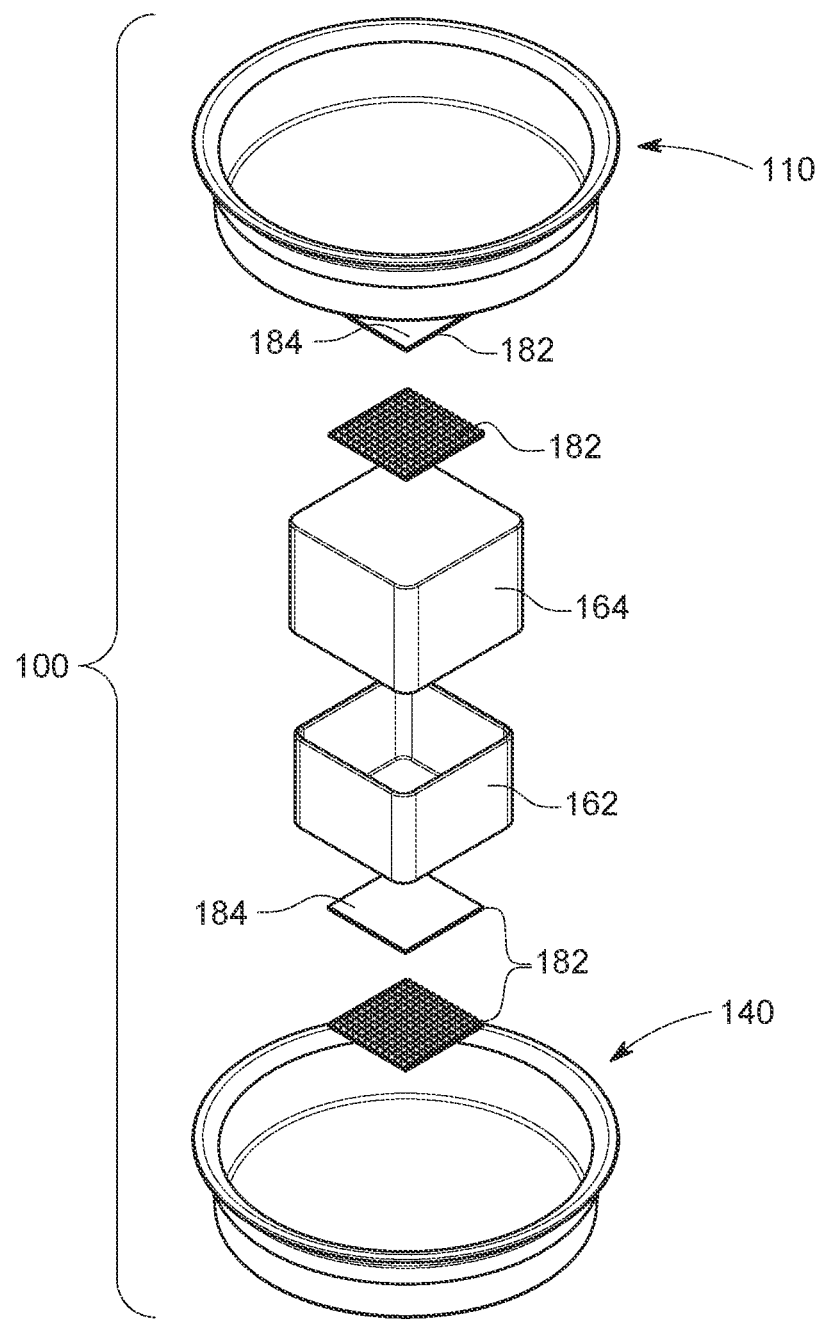
FIG. 5 illustrates an exploded isometric view of the pet food bowl with insect exclusion.

Referring to FIGS. 4 and 5, an exploded side view and an exploded isometric view of the pet food bowl with insect exclusion are shown.

The pet food bowl with insect exclusion 100 is shown with upper bowl 110 and lower bowl 140, separated by the weight box 160 formed from weight box base 162 and weight box lid 164.

The weight box is connected to the upper bowl 110 and lower bowl 140 by sets of reclosable fasteners 180 formed from fasteners 182, each with a layer of adhesive 184.

The use of reclosable fasteners 180 allows the pet food bowl with insect exclusion 100 to be disassembled for transport and cleaning.

Figure 6:
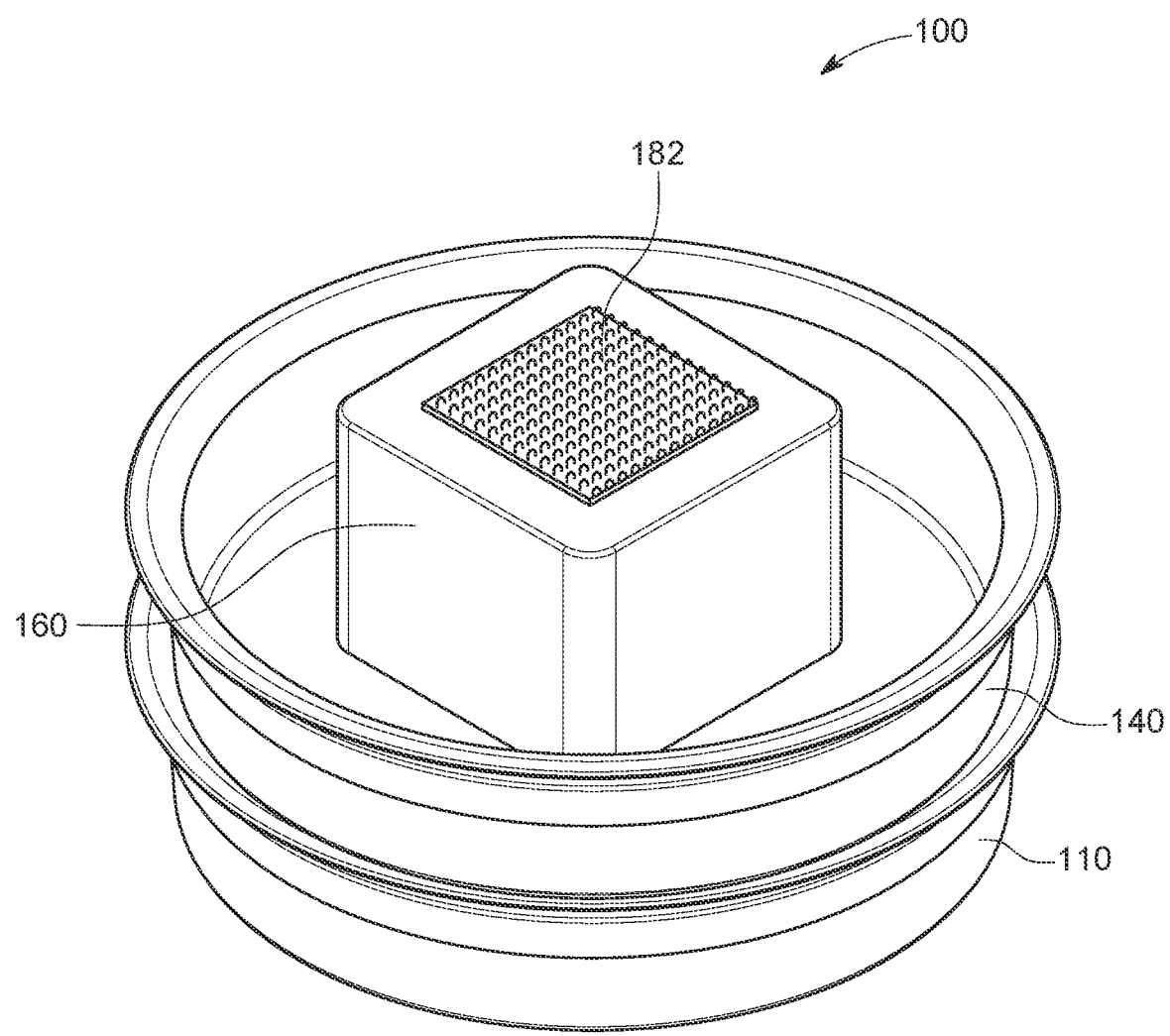
FIG. 6 illustrates a nested view of the pet food bowl with insect exclusion.

Referring to FIG. 6, a nested view of the pet food bowl with insect exclusion is shown.

For storage and transportation, the upper bowl 110 can be removed and placed under the lower bowl 140, leaving the weight box 160 with fastener 182 in place. The result is a lower profile, better for shipping or transportation.

Figure 7:
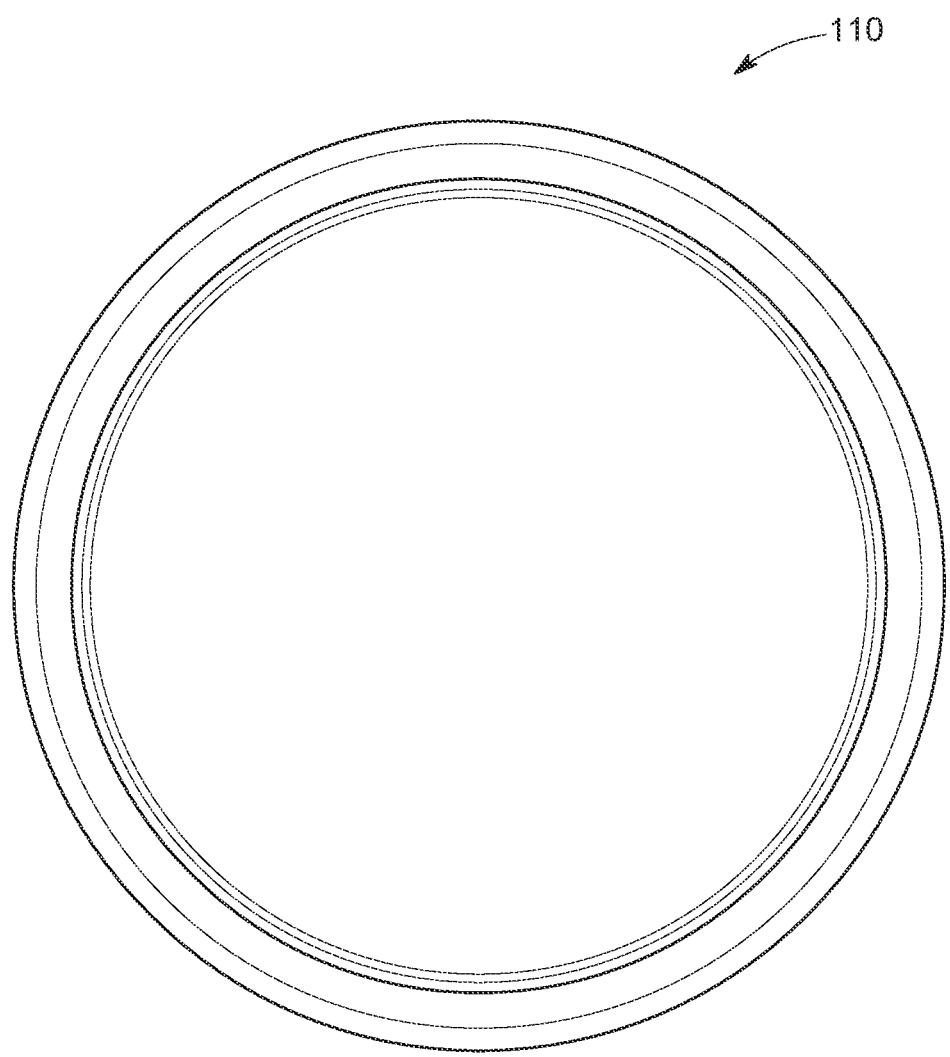
FIG. 7 illustrates a top view of the pet food bowl with insect exclusion.

Referring to FIG. 7, a top view of the pet food bowl with insect exclusion is shown.

The upper bowl 110 is shown.

Figure 8:
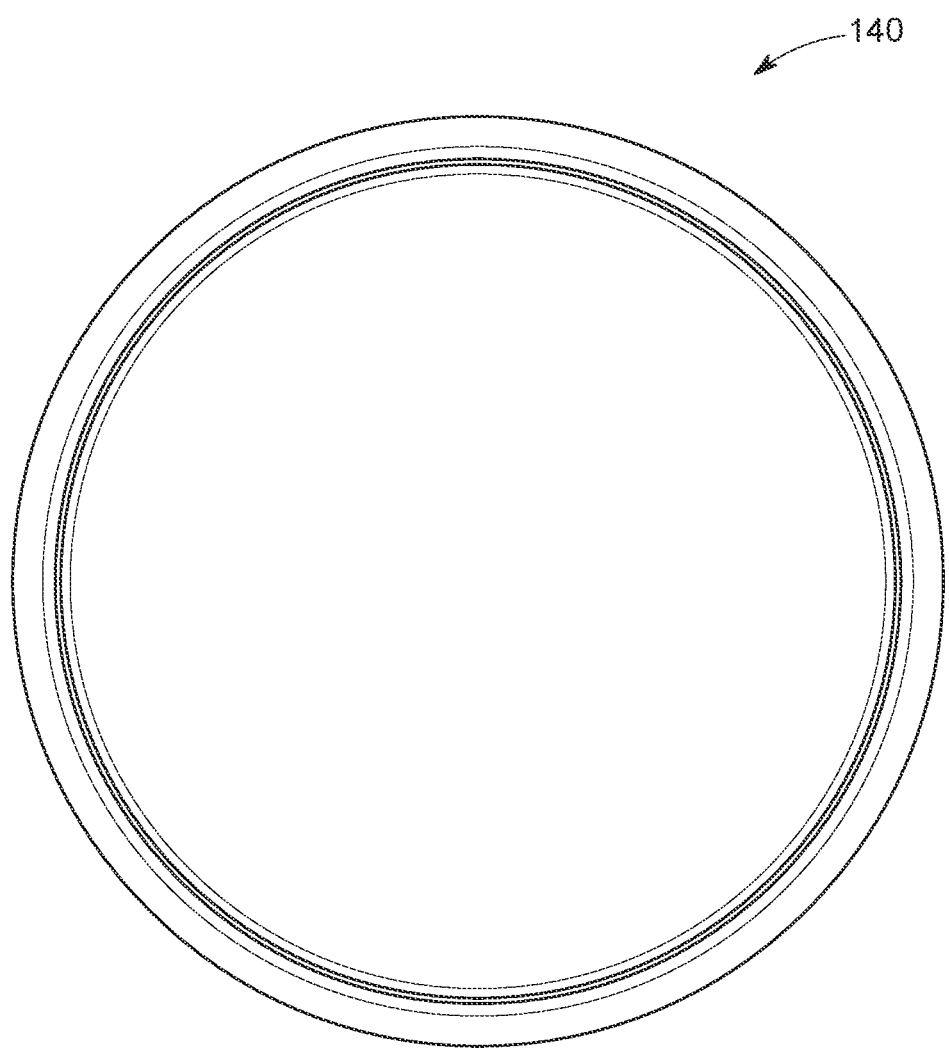
FIG. 8 illustrates a bottom view of the pet food bowl with insect exclusion.

Referring to FIG. 8, a bottom view of the pet food bowl with insect exclusion is shown.

The lower bowl 140 is shown.

Figure 9:
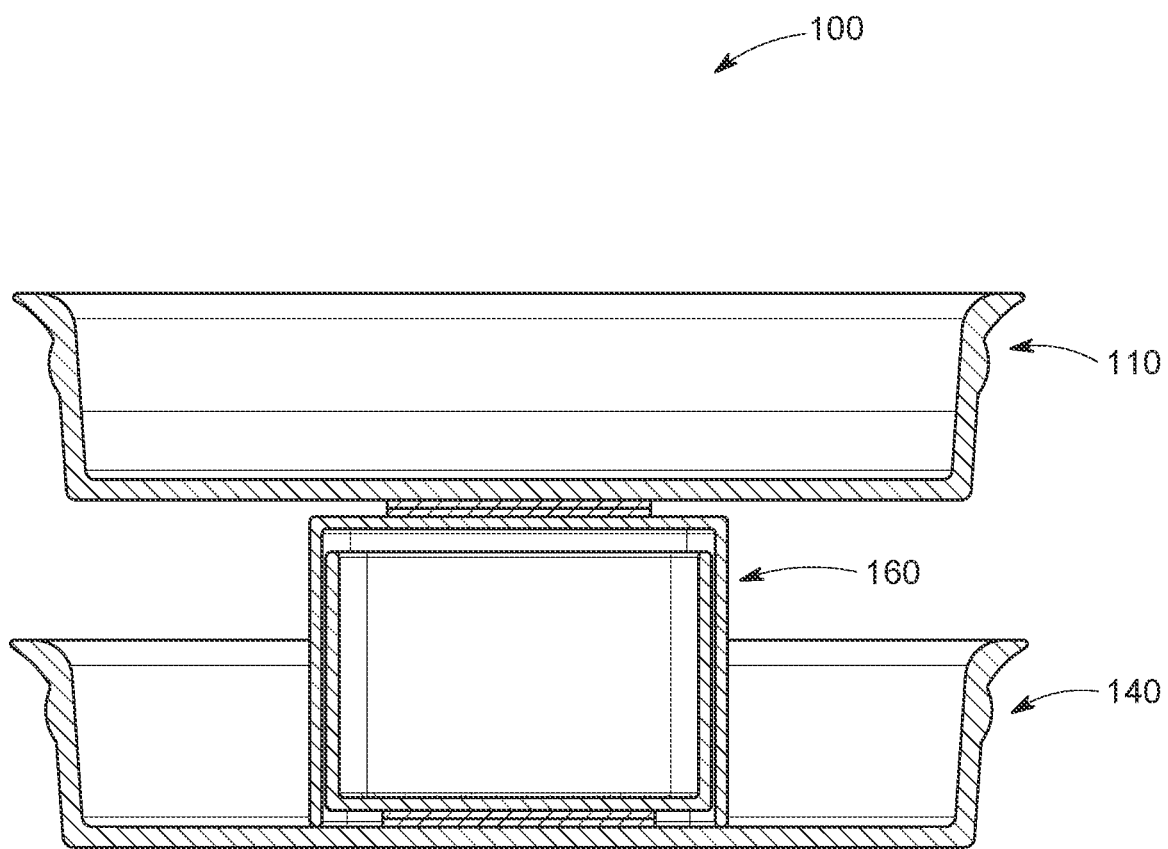
FIG. 9 illustrates a second cross-sectional view of the pet food bowl with insect exclusion.

Referring to FIG. 9, a second cross-sectional view of the pet food bowl with insect exclusion is shown.

The pet food bowl with insect exclusion 100 is shown empty, with the upper bowl 110, lower bowl 140, and weight box 160.

Equivalent elements can be substituted for the ones set forth above such that they perform in substantially the same manner in substantially the same way for achieving substantially the same result.

What is claimed is:

1. A pet food bowl system to exclude insects from pet food, system comprising:
   an upper bowl and a lower bowl;
   the upper bowl directly above and separated from the lower bowl;
   a bottom of the upper bowl spaced apart from a top of the lower bowl;
   a weight box positioned between the upper bowl and the lower bowl;
   the weight box including a base and a removable lid;
   the weight box maintaining separation between the upper bowl and the lower bowl;
   the weight box including an interior space intended to be filled with a dense material;
   whereby the lower bowl is filled with water, requiring any crawling insects to traverse the water before accessing the pet food.

2. The pet food bowl system to exclude insects from pet food of claim 1, further comprising:
   reclosable fasteners;
   the reclosable fasteners affixing a lid of the weight box to the upper bowl and a base of the weight box to the lower bowl;
   whereby the reclosable fasteners allow the weight box to be removed from the upper bowl and the lower bowl.

3. The pet food bowl system to exclude insects from pet food of claim 2, wherein the upper bowl further comprises:
   an exterior wall hump;
   the exterior wall hump protruding outward from the upper bowl;
   whereby the exterior wall hump increases a first angle a climbing insect must overcome to reach an interior of the upper bowl.

4. The pet food bowl system to exclude insects from pet food of claim 3, wherein the upper bowl further comprises:
   an exterior lip;
   the exterior lip protruding outward from the upper bowl;
   whereby the exterior lip increases a second angle a climbing insect must overcome to reach an interior of the upper bowl.

5. The pet food bowl system to exclude insects from pet food of claim 1, wherein the upper bowl further comprises:
   an exterior wall hump;
   the exterior wall hump protruding outward from the upper bowl;
   whereby the exterior wall hump increases a first angle a climbing insect must overcome to reach an interior of the upper bowl.

6. The pet food bowl system to exclude insects from pet food of claim 1, wherein the upper bowl further comprises:
   an exterior lip;
   the exterior lip protruding outward from the upper bowl;
   whereby the exterior lip increases a second angle a climbing insect must overcome to reach an interior of the upper bowl.

7. A pet food bowl system for preventing access by insects, comprising:
   a base bowl for containing a liquid, the base bowl having a bottom and an upwardly extending sidewall;
   a food bowl configured to contain pet food, the food bowl having a bottom and an upwardly extending sidewall; and
   an elevation structure coupled to the food bowl and configured to elevate the food bowl above the base bowl such that the bottom of the food bowl is positioned at a higher elevation than a top edge of a sidewall of the base bowl when the base bowl contains the liquid;

the elevation structure being a weight box positioned between the food bowl and the base bowl;
the weight box including a base and a removable lid;
the weight box maintaining separation between the food bowl and the base bowl;
the weight box including an interior space intended to be filled with a dense material;
wherein insects must traverse across the liquid contained in the base bowl to access pet food contained in the food bowl.

8. The pet food bowl system for preventing access by insects of claim 7, further comprising:
reclosable fasteners;
the reclosable fasteners affixing a lid of the weight box to the food bowl and a base of the weight box to the base bowl;
whereby the reclosable fasteners allow the weight box to be removed from the food bowl and the base bowl.

9. The pet food bowl system for preventing access by insects of claim 8, wherein the food bowl further comprises:
an exterior wall hump;
the exterior wall hump protruding outward from the food bowl;
whereby the exterior wall hump increases a first angle a climbing insect must overcome to reach an interior of the food bowl.

10. The pet food bowl system for preventing access by insects of claim 9, wherein the food bowl further comprises:
an exterior lip;
the exterior lip protruding outward from the food bowl;
whereby the exterior lip increases a second angle a climbing insect must overcome to reach an interior of the food bowl.

11. The pet food bowl system for preventing access by insects of claim 7, wherein the food bowl further comprises:
an exterior wall hump;
the exterior wall hump protruding outward from the food bowl;
whereby the exterior wall hump increases a first angle a climbing insect must overcome to reach an interior of the food bowl.

12. The pet food bowl system for preventing access by insects of claim 7, wherein the food bowl further comprises:
an exterior lip;
the exterior lip protruding outward from the food bowl;
whereby the exterior lip increases a second angle a climbing insect must overcome to reach an interior of the food bowl.

13. A pet food separation system, comprising:
a lower liquid reservoir having a bottom surface and configured to hold a liquid;
an upper food receptacle configured to hold pet food, the upper food receptacle having a bottom surface;
an elevation structure coupled to the upper food receptacle and configured to vertically space the bottom surface of the upper food receptacle above a top level of liquid held in the lower liquid reservoir;
the elevation structure being a weight box positioned between the upper food receptacle and the lower liquid reservoir;
the weight box including a base and a removable lid;
the weight box maintaining separation between the upper food receptacle and the lower liquid reservoir;
the weight box including an interior space intended to be filled with a dense material;
wherein insects attempting to access pet food contained in the upper food receptacle must traverse across the liquid held in the lower liquid reservoir to reach the upper food receptacle containing the pet food.

14. The pet food separation system of claim 13, further comprising:
reclosable fasteners;
the reclosable fasteners affixing a lid of the weight box to the upper food receptacle and a base of the weight box to the lower liquid reservoir;
whereby the reclosable fasteners allow the weight box to be removed from the upper food receptacle and the lower liquid reservoir.

15. The pet food separation system of claim 14, wherein the upper food receptacle further comprises:
an exterior wall hump;
the exterior wall hump protruding outward from the upper food receptacle;
whereby the exterior wall hump increases a first angle a climbing insect must overcome to reach an interior of the upper food receptacle.

16. The pet food separation system of claim 13, wherein the upper food receptacle further comprises:
an exterior wall hump;
the exterior wall hump protruding outward from the upper food receptacle;
whereby the exterior wall hump increases a first angle a climbing insect must overcome to reach an interior of the upper food receptacle.

17. The pet food separation system of claim 13, wherein the upper food receptacle further comprises:
an exterior lip;
the exterior lip protruding outward from the upper food receptacle;
whereby the exterior lip increases a second angle a climbing insect must overcome to reach an interior of the upper food receptacle.

* * * * *